US008499060B2

(12) United States Patent
Narayanan et al.

(10) Patent No.: US 8,499,060 B2
(45) Date of Patent: Jul. 30, 2013

(54) UPGRADING SYSTEM SOFTWARE IN A CHASSIS WITHOUT TRAFFIC LOSS

(75) Inventors: Kumaran Narayanan, San Ramon, CA (US); Siva Madasamy, San Jose, CA (US); Aparna Adhav, Fremont, CA (US); Saurabh Agarwal, Fremont, CA (US); Kalash Nainwal, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 403 days.

(21) Appl. No.: 12/727,535

(22) Filed: Mar. 19, 2010

(65) Prior Publication Data

US 2011/0231833 A1    Sep. 22, 2011

(51) Int. Cl.
*G06F 15/177* (2006.01)

(52) U.S. Cl.
USPC ........... 709/220; 709/208; 709/209; 709/221; 709/222; 709/223; 709/226

(58) Field of Classification Search
USPC ................. 709/208, 209, 220, 223, 226, 221, 709/222
See application file for complete search history.

(56) References Cited

U.S. PATENT DOCUMENTS

| 2002/0176131 | A1* | 11/2002 | Walters et al. ................. 359/118 |
| 2005/0198247 | A1* | 9/2005 | Perry et al. ..................... 709/223 |
| 2008/0112312 | A1* | 5/2008 | Hermsmeyer et al. ........ 370/228 |
| 2008/0240133 | A1* | 10/2008 | Tanaka ........................... 370/401 |
| 2008/0298236 | A1* | 12/2008 | Ervin et al. .................... 370/232 |
| 2009/0279431 | A1* | 11/2009 | Baruah et al. ................. 370/235 |
| 2009/0304163 | A1* | 12/2009 | Chen et al. ................. 379/93.09 |
| 2010/0202452 | A1* | 8/2010 | Ram et al. ...................... 370/390 |

OTHER PUBLICATIONS

Julian Lucek et al., "In-Service Software Upgrade (ISSU)", Juniper Networks (UK) Limited, May 13, 2009, 18 pages.

* cited by examiner

*Primary Examiner* — Liangche A Wang
(74) *Attorney, Agent, or Firm* — Harrity & Harrity, LLP

(57) ABSTRACT

Rolling software upgrades may be employed for a network device in a modular chassis and/or virtual chassis. The network device may include memory devices to store a software upgrade package and a group of instructions, and a processor. The processors may install the software upgrade package on a backup routing engine; determine subsets of multiple line cards on which to perform a software upgrade, where ports in each of the multiple line cards are part of a link aggregation group (LAG); initiate a reboot process for each of the subsets of multiple line cards, in sequence, where the reboot process for each of the line cards results in a software upgrade without deactivating any LAG. The processors may also switch the backup routing engine and a master routing engine to create a new master routing engine and a new backup routing engine, and install the upgrade package on the new backup routing engine.

20 Claims, 9 Drawing Sheets

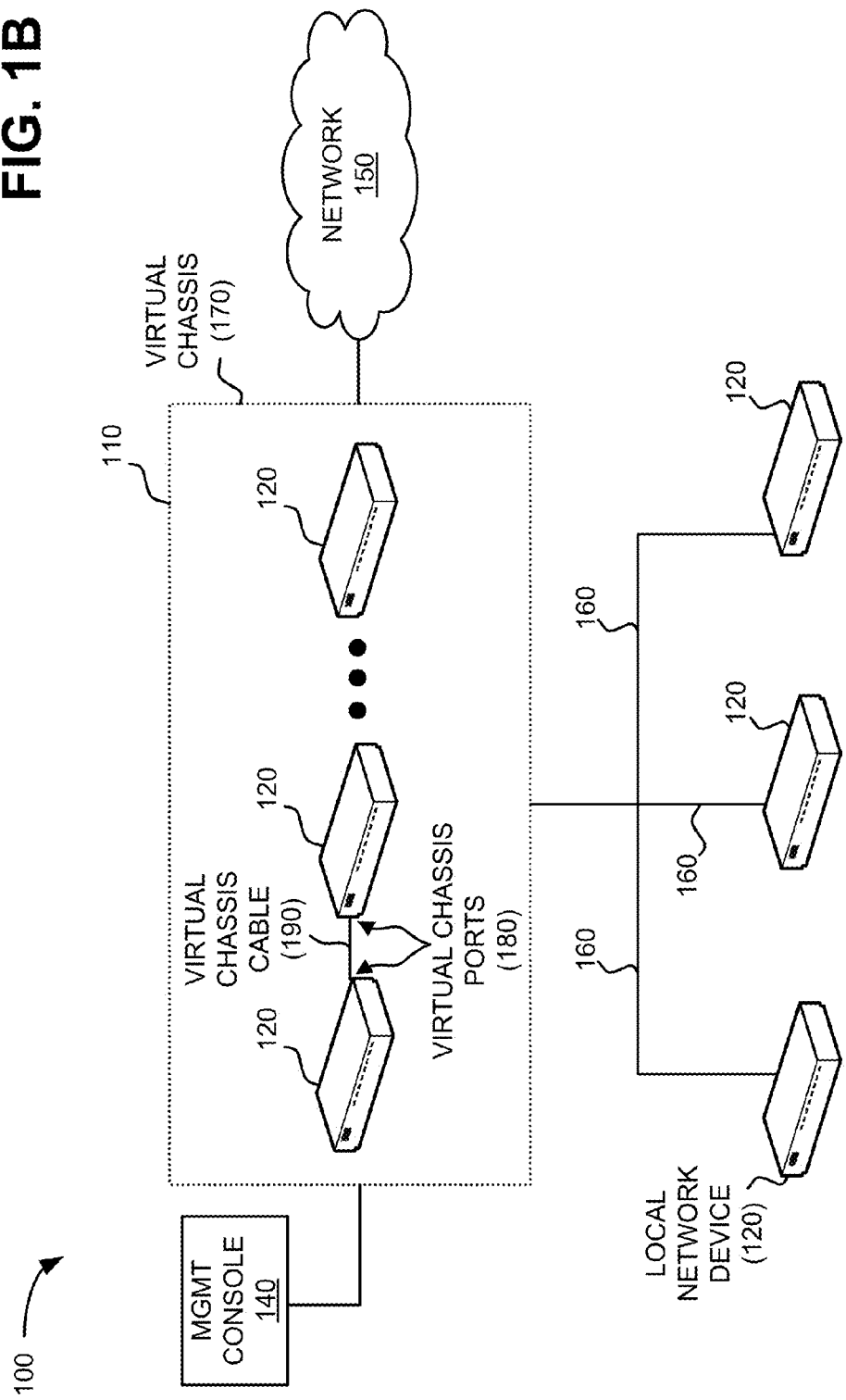

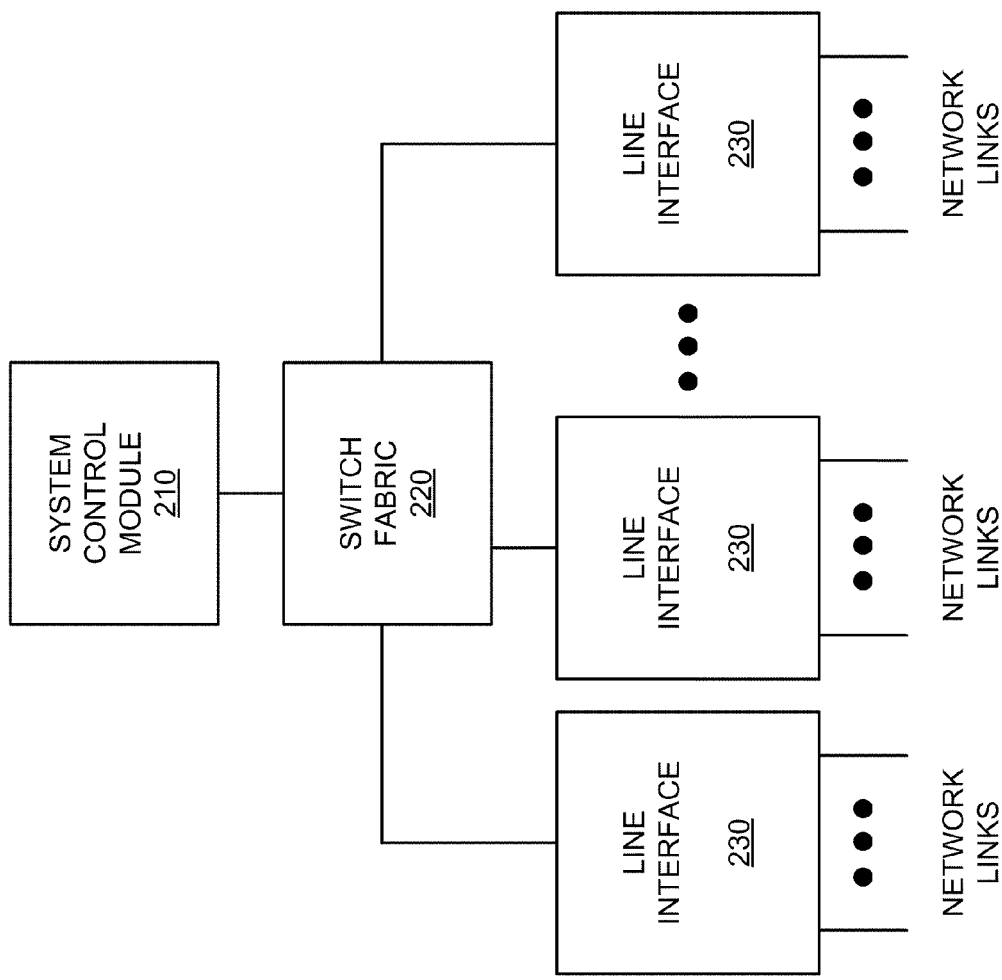

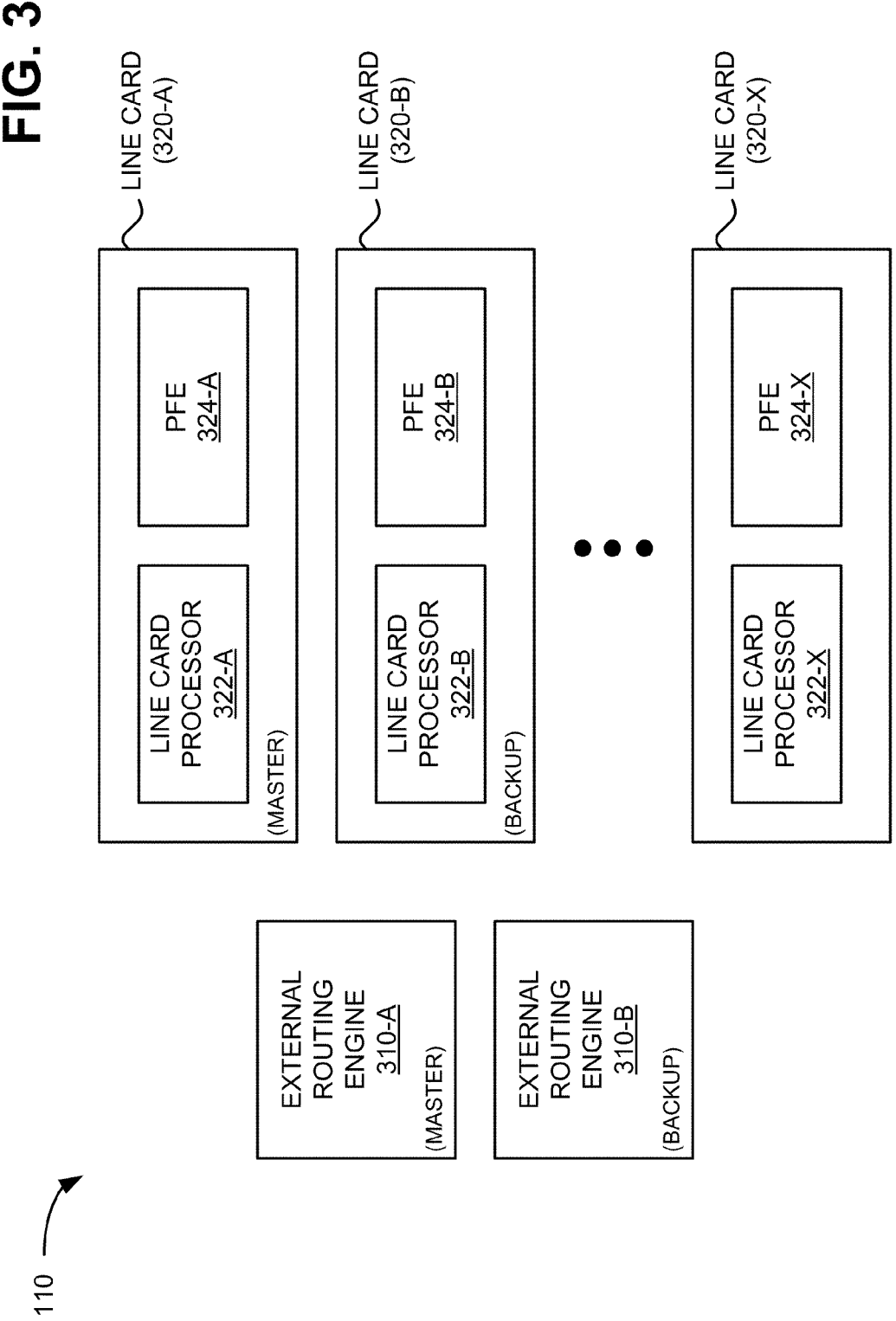

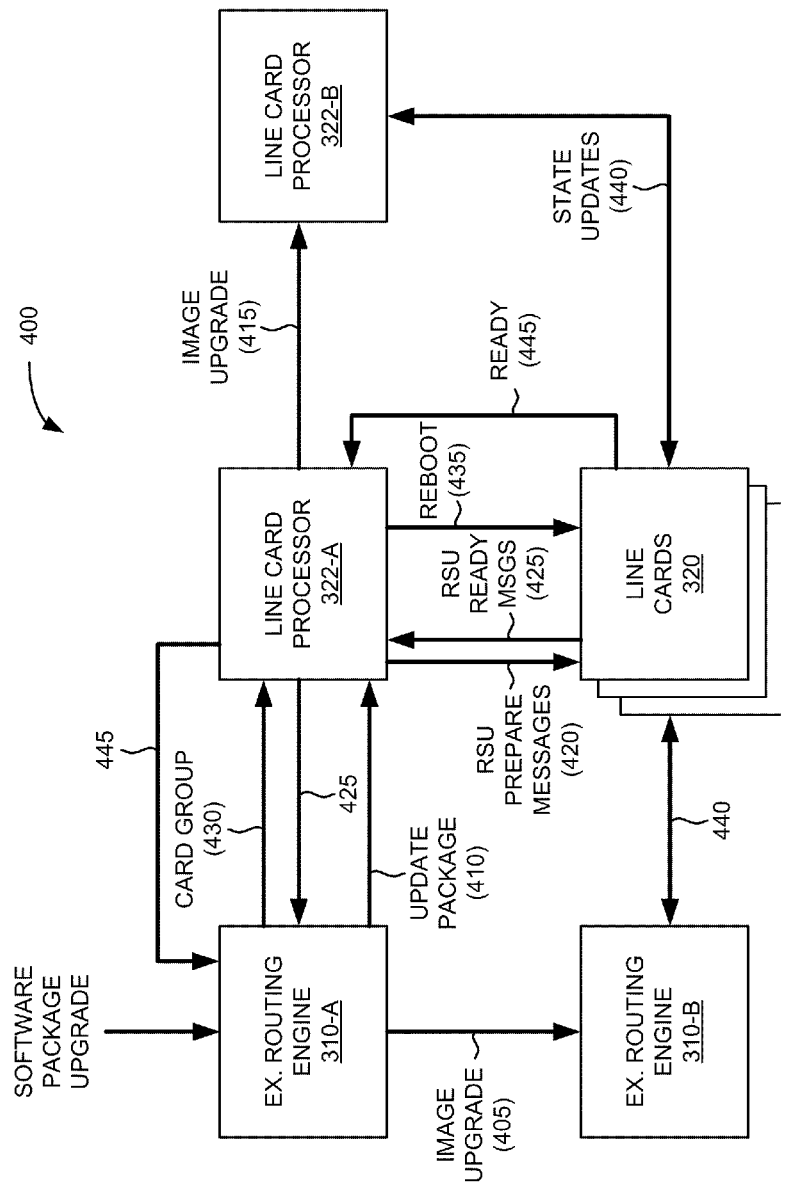

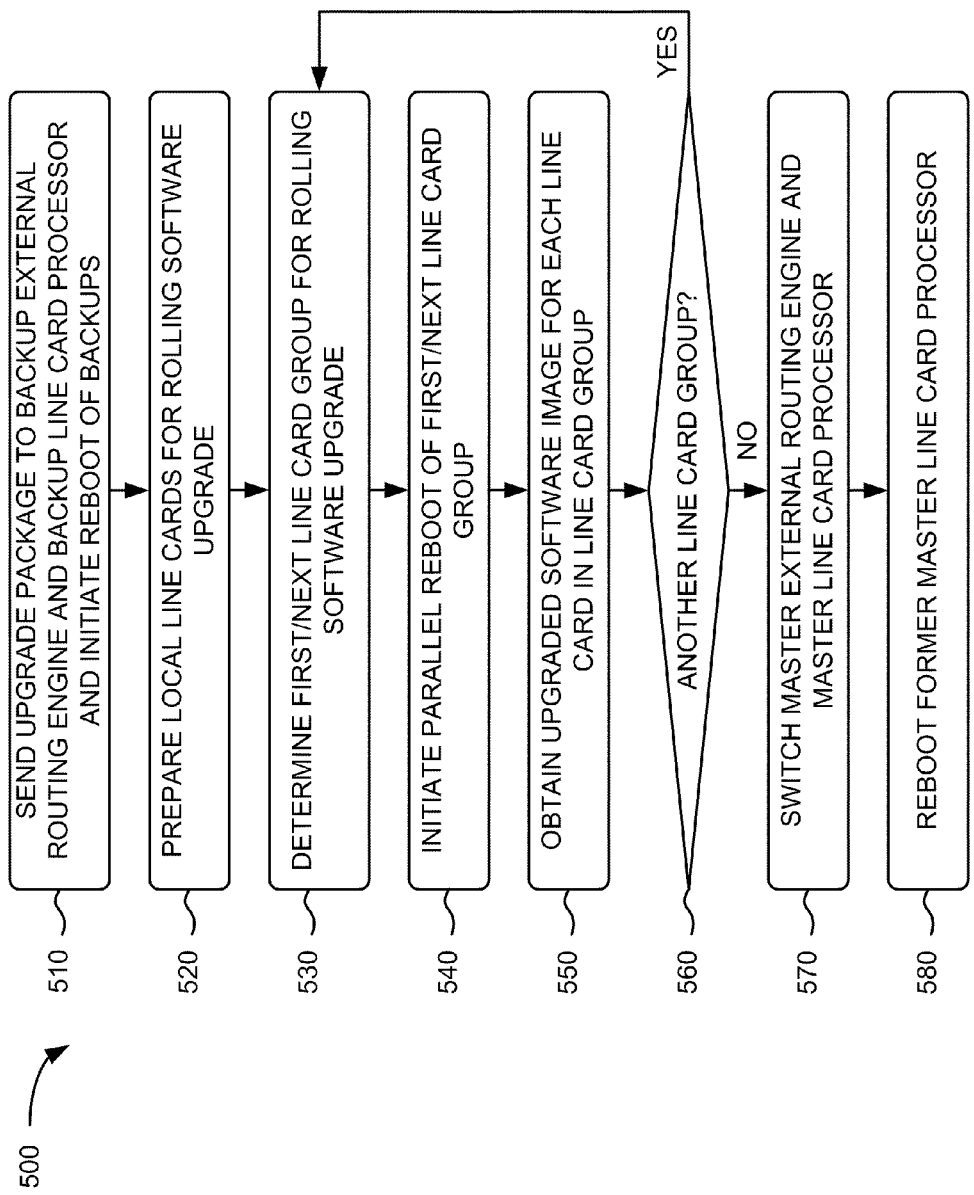

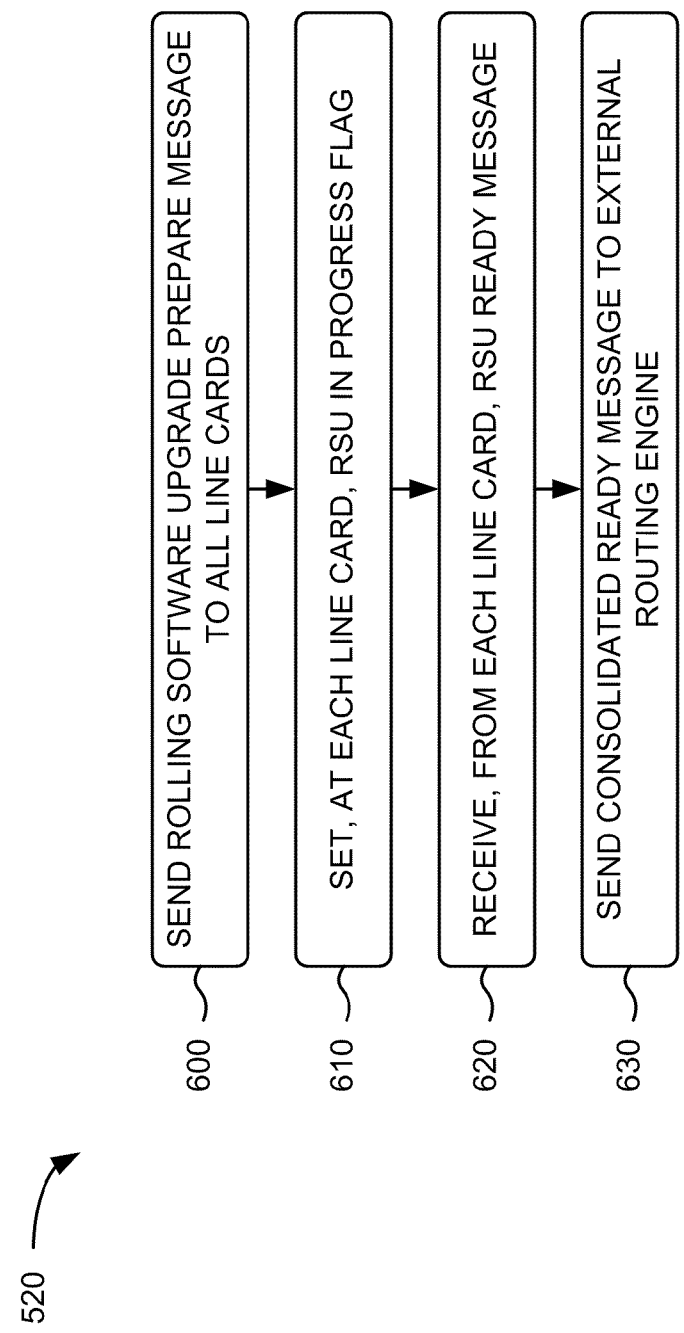

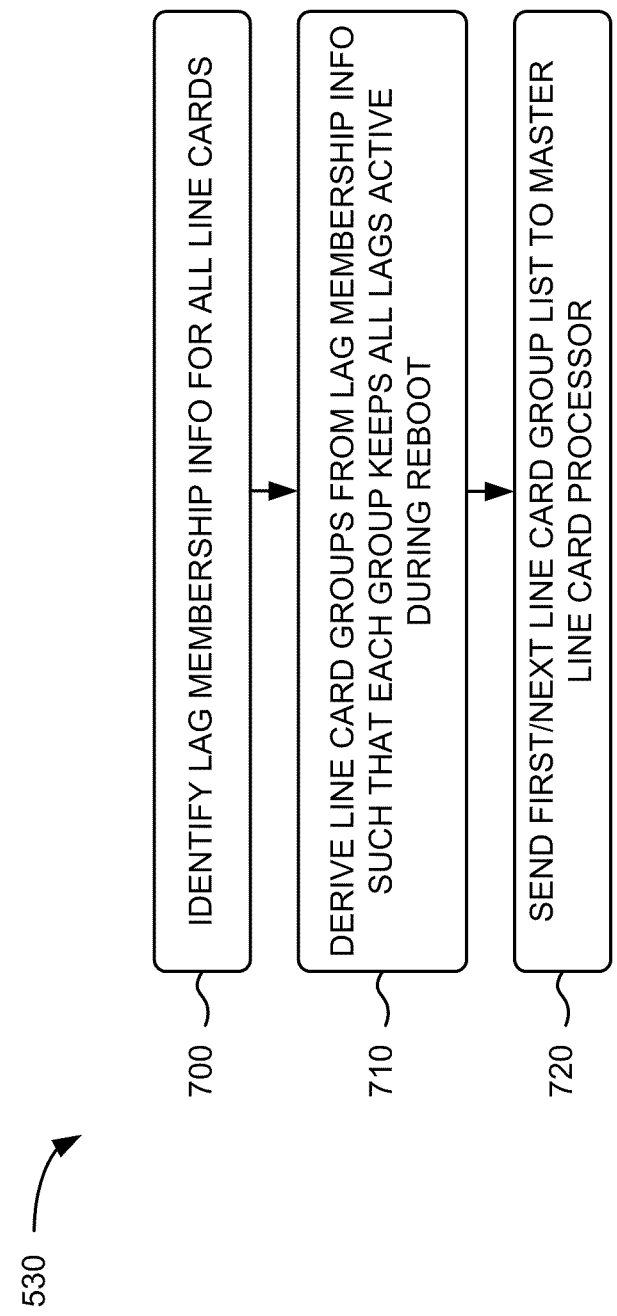

UPGRADING SYSTEM SOFTWARE IN A CHASSIS WITHOUT TRAFFIC LOSS

BACKGROUND

In a network environment, a modular chassis may be deployed for a group of network devices (e.g., switches or routers) to behave as a single network device. Alternatively, or additionally, a virtual chassis may be implemented by connecting a group (e.g., two or more) physically separate network devices together using cables that allow the network devices to behave as a single network device. In such networking environments, there is a high demand to upgrade the system software on these chassis without affecting the network traffic.

In a traditional dual chassis deployment, one chassis at a time can be brought down completely because there is total redundancy. Some dual chassis environments employ the use of link aggregation groups (LAGs) to provide redundancy while maximizing bandwidth by utilizing the second chassis. A LAG may be used to provide load balancing across multiple parallel links between two network devices while providing local link protection. However, LAG configurations typically distribute redundancy among all available network devices, thus preventing the bringing down of a single network device to perform software upgrades without affecting the network traffic.

SUMMARY

According to one aspect, a method may be performed by a network device. The method may include receiving, by the network device, an upgrade package, where the network device operates as one of a modular chassis or a virtual chassis that corresponds to a single logical network device, and sending, by a master routing engine of the network device, the upgrade package to a backup routing engine of the network device. The method may further include preparing, by the network device, multiple line cards for a software upgrade, where ports in each of the multiple line cards are part of a link aggregation group (LAG); determining, by the network device, a subset of the multiple line cards on which to perform the software upgrade; and initiating, by the network device, a reboot process for the subset of multiple line cards, where the reboot process for each of the line cards of the subset of multiple line cards results in a software upgrade. The method may also include repeating the determining and the initiating until all line cards in the multiple line cards have been upgraded; and switching, by the network device and in response to all line cards being upgraded, the role of the backup routing engine and the role of the master routing engine to create a new master routing engine and a new backup routing engine.

According to another aspect, a network device may include one or more memory devices, to store a software upgrade package and a plurality of instructions, and one or more processors. The one or more processors may install the software upgrade package on a backup routing engine; determine subsets of multiple line cards on which to perform a software upgrade, where ports in each of the multiple line cards are part of a LAG; and initiate a reboot process for each of the subsets of multiple line cards, in sequence, where the reboot process for each of the line cards of the subsets of multiple line cards results in a software upgrade without deactivating any LAG. The one or more processors may also switch the backup routing engine and a master routing engine to create a new master routing engine and a new backup routing engine, and install the upgrade package on the new backup routing engine.

According to yet another aspect, a computer-readable memory device may store instructions executable by one or more processors. The computer-readable memory device may include one or more instructions for altering the reboot instructions for multiple line cards to enable a software upgrade of the multiple line cards, where ports in each of the multiple line cards are part of a LAG; one or more instructions for determining a subset of the multiple line cards on which to perform the software upgrade without deactivating the LAG; one or more instructions for initiating a reboot process for the subset of the multiple line cards, where the reboot process for each of the line cards of the subset of the multiple line cards results in the software upgrade without deactivating the LAG; and one or more instructions for restoring the reboot instructions for the multiple line cards to terminate the software upgrade.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 1B is a diagram of another exemplary network in which systems and/or methods described herein may be implemented;

FIG. 2 is a diagram of exemplary components of a network device depicted in FIGS. 1A and 1B;

FIG. 3 is a diagram illustrating exemplary functional components of a core network device of FIG. 1A;

FIGS. 4A and 4B illustrate a diagram of exemplary interactions among components of an exemplary portion of the core network device depicted in FIG. 1A; and FIGS. 5-7 are flow diagrams illustrating an exemplary process for performing rolling software upgrades according to an implementation described herein.

DETAILED DESCRIPTION

The following detailed description refers to the accompanying drawings. The same reference numbers in different drawings may identify the same or similar elements. Also, the following description does not limit the invention. Rather, the scope of the invention is defined by the appended claims and equivalents.

Implementations described herein may include systems and/or methods that may provide rolling software upgrades for network devices deployed in a modular chassis and/or virtual chassis. Links to/from the chassis may be implemented as LAGs. In an exemplary implementation, a backup routing engine may receive the software upgrades, followed by line cards in particular groupings, and then a master routing engine. The line cards may be rebooted completely without having to account for software state. The line cards may be rebooted in such a manner that at least some links within each LAG remain active at any time. Using available LAG membership information, the systems and/or methods described herein may automatically derive a list of sets of line cards, so that as many line cards as possible may be rebooted in parallel, while still keeping each of the LAGs active. Rebooting the line cards causes the line cards to be upgraded to newer software. Thus, when all the line cards are rebooted, the system may be completely upgraded.

The terms "component" and "device," as used herein, are intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Sample Network

Figure 1A:
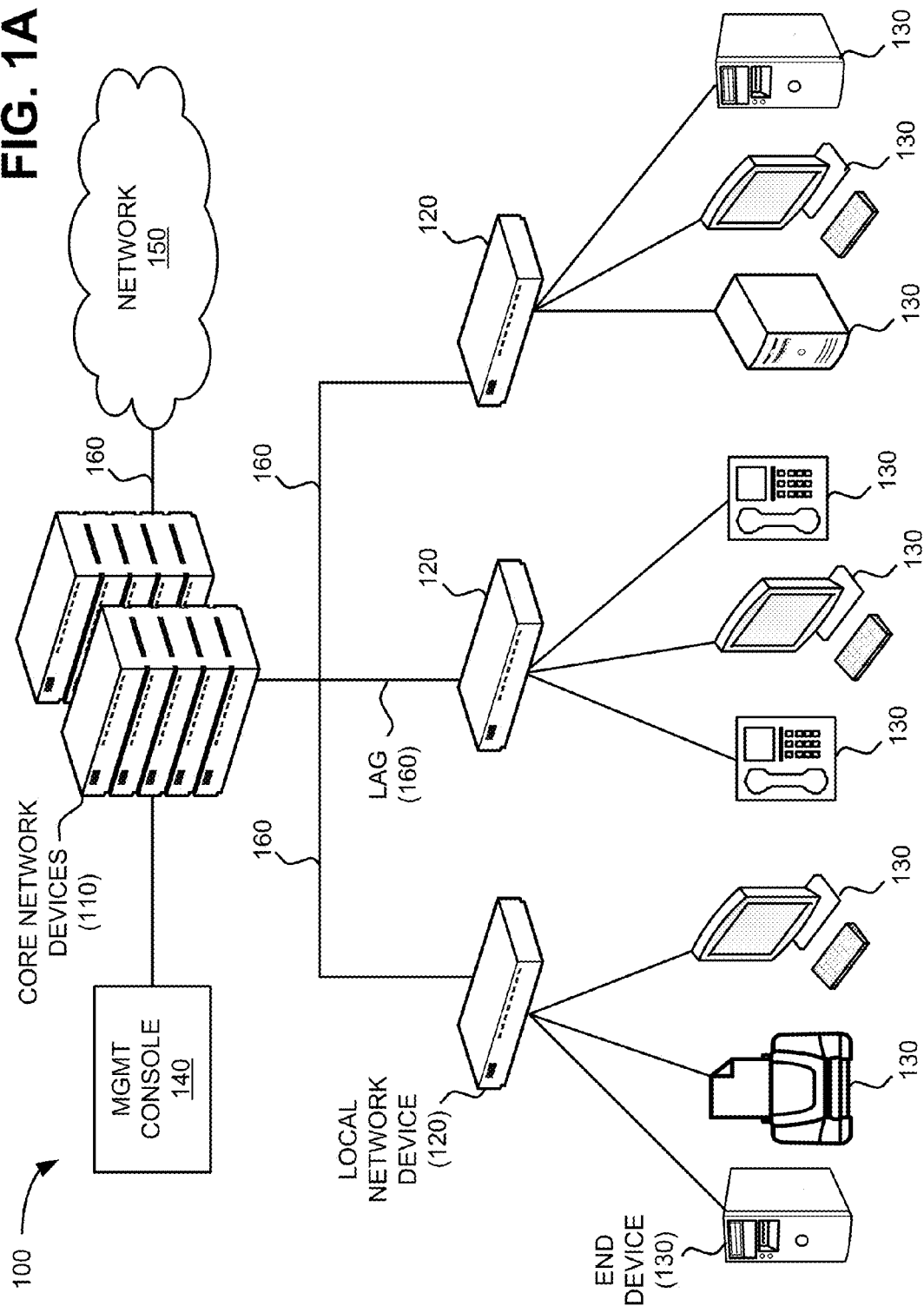
FIG. 1A is a diagram of an exemplary network in which systems and/or methods described herein may be implemented.

FIG. 1A is a diagram of an exemplary network in which systems and/or methods described herein may be implemented. As illustrated, network 100 may include one or more core network devices 110, one or more local network devices 120, one or more end devices 130, a management console 140, and a network 150. Components of network 100 may interconnect via wired and/or wireless connections. A single core network device 110, three local network devices 120, several end devices 130, one management console 140, and one network 150 have been illustrated in FIG. 1A for simplicity. In practice, there may be more or fewer core network devices 110, local network devices 120, end devices 130, management consoles 140, and/or networks 150. Also, in some instances, one or more of the components of network 100 may perform one or more tasks described as being performed by another one or more of the components of network 100.

Core network devices 110 and local network devices 120 may each include a device having the capability to communicate with other devices, systems, networks, and/or the like. For example, core network devices 110 and/or local network devices 120 may correspond to a router, a switch (e.g., an Ethernet switch), a network device that provides layer 2 and/or layer 3 functionality, or some other type of communication device that may process and/or forward network traffic. In one implementation, core network devices 110 may be configured as a modular chassis of multiple line cards. In another implementation, core network device 110 may be configured as a virtual chassis including multiple line cards.

Local network devices 120 may connect various end devices 130 to core network devices 110, which may, in turn, connect to devices within network 150. Connections between core network device 110 and local network devices 120 and/or connections between core network device 110 and network 150 may be implemented as LAGs 160.

Each end device 130 may include a device having the capability to communicate with other devices, systems, networks, and/or the like. For example, end device 130 may include a computer (e.g., a laptop, a desktop), a printer, a server, a telephone, or some other type of user device.

Management console 140 may include any device that is capable of communicating with core network device 110. For example, management console 140 may include a laptop computer, a personal computer, a server device, or other types of computation or communication devices. In one exemplary implementation, management console 140 may include software package upgrades and software for remotely analyzing and/or debugging one or more components of core network device 110.

Network 150 may include one or more networks of any type. For example, network 150 may include a local area network (LAN), a wide area network (WAN), a metropolitan area network (MAN), a telephone network (such as the Public Switched Telephone Network (PSTN), a Public Land Mobile Network (PLMN), a wireless network), an intranet, the Internet, an optical fiber (or fiber optic)-based network, or a combination of networks.

Referring to FIG. 1B, an alternate configuration for core network device 110 is shown within a portion of network 100. In the configuration of FIG. 1B, the components (shown as network devices 120) that make up core network device 110 may be included within a virtual chassis 170. Virtual chassis 170 may permit a group of network devices 120 to interconnect to create a single logical device acting as core network device 110. In one implementation, multiple local network devices 120 may be managed as a single core network device 110 for performing rolling software upgrades. In another implementation, multiple core network devices (e.g., module chassis devices) may be interconnected to form a virtual chassis.

As shown in FIG. 1B, each local network device 120 within virtual chassis 170 may include virtual chassis ports 180 which permit network device 120 to interconnect with another network device 120 via virtual chassis cable 190. In one implementation, network devices 120 may be interconnected in a ring configuration. Systems and/or methods described herein may be applicable to core network device 110 in either a modular chassis configuration or virtual chassis configuration.

Referring collectively to FIGS. 1A and 1B, in an exemplary operation, assume that core network device 110 and local network devices 120 are operating in a normal mode, where network traffic (e.g., packets) may be received, processed, and transmitted. Assume that a software upgrade is to be implemented on core network device 110 without disrupting service to end devices 130. In this instance, components within core network device 110 may need to be rebooted, however, packets may still be received and transmitted by core network device 110 while the software upgrade is being performed. Thus, according to implementations described herein, software upgrades to core network device 110 may be performed in manner that maintains each of LAGs 160 during the software upgrade process.

Exemplary Network Device Architecture

FIG. 2 is a diagram illustrating exemplary components of a device 200, which may correspond to one or more of core network device 110 or network devices 120. As illustrated in FIG. 2, device 200 may include, for example, a system control module 210, a switch fabric 220, and a group of line interfaces 230.

System control module 210 may include one or multiple processors, microprocessors, application specific integrated circuits (ASICs), field programming gate arrays (FPGAs), and/or processing logic that may be optimized for networking and communications. System control module 210 may perform high level management functions for network device 200. For example, system control module 210 may communicate with other networks, devices, and/or systems connected to network device 200 to exchange information regarding network topology. In some implementations, system control module 210 may include a routing engine for creating routing tables based on network topology information, creating forwarding tables based on the routing tables, and sending these tables to line interfaces 230 for packet routing. System control module 210 may also include a static memory (e.g. a read only memory (ROM)), a dynamic memory (e.g. a random access memory (RAM)), onboard cache, and/or flash memory for storing data and/or machine-readable instructions.

Switch fabric 220 may include one or multiple switching planes to facilitate communication among line interfaces 230 and/or system control module 210. In one implementation, each of the switching planes may include a single-stage switch or a multi-stage switch of crossbar elements. Switch fabric 220 may also, or alternatively, include processors, memories, and/or paths that permit communication among system control module 210 and line interfaces 230.

Line interfaces 230 may include devices or assemblies, such as line cards, for receiving incoming traffic (e.g., packets) from network links (or from other line interfaces 230) and for transmitting the traffic to network links (or to other line interfaces 230). For example, line interfaces 230 may include wireless and/or wireless interfaces, such as, Ethernet interfaces, optical carrier (OC) interfaces, and/or asynchronous transfer mode (ATM) interfaces. Line interfaces 230 may manage a set of input ports via which packets can be received and a set of output ports via which packets can be transmitted. Line interfaces 230 may include memory, one or more processors, and/or other logic.

Depending on the implementation, the components that are illustrated in FIG. 2 may provide fewer or additional functionalities. For example, if device 200 performs an Internet Protocol (IP) packet routing function as part of a MPLS router, system control module 210 may perform tasks associated with obtaining routing information from other routers in a multiprotocol label switching (MPLS) network. In such cases, conveying network traffic from one interface to another may involve label-based routing, rather than IP address-based routing.

Device 200 may perform operations and/or processes related to routing and/or switching. According to an exemplary implementation, device 200 may perform these operations and/or processes in response to system control module 210 executing sequences of instructions contained in a computer-readable medium. A computer-readable medium may be defined as a physical or logical memory device. A logical memory device may include memory space within a single physical memory device or spread across multiple physical memory devices. For example, software instructions may be read into a memory from another computer-readable medium or from another device (e.g., management console 140) via line interfaces 230. The software instructions contained in the memory may cause system control module 210 to perform processes that are described herein. Alternatively, hardwired circuitry may be used in place of or in combination with software instructions to implement processes described herein. Thus, implementations described herein are not limited to any specific combination of hardware circuitry and software.

Although, FIG. 2 illustrates exemplary components of device 200, in other implementations, device 200 may include additional, fewer, different, or differently arranged components than those illustrated in FIG. 2 and described herein. Additionally, or alternatively, one or more operations described as being performed by a particular component of device 200 may be performed by one or more other components, in addition to or instead of the particular component of device 200.

Exemplary Line Interface Architecture

FIG. 3 is a diagram illustrating exemplary functional components of core network device 110. The functional components illustrated in FIG. 3 may be implemented by hardware (e.g., one or more processors or other processing logic) or a combination of hardware and software. As illustrated, core network device 110 may include external routing engines 310-A and 310-B (collectively, "external routing engines 310" or generically, "external routing engine 310") and line cards 320-A, 320-B, 320-X (collectively "line cards 320" or generically, "line cards 320"). Each line card 320 may include a line card processor 322 and a packet forwarding engine (PFE) 324.

External routing engines 310 may implement chassis protocols for line cards 320. External routing engines 310 may include as a master routing engine (e.g., external routing engine 310-A) and a backup routing engine (e.g., external routing engine 310-B). Master routing engine 310-A may run the chassis management processes and control protocols for network device 110 and manage the individual line cards 320. Backup routing engine 310-B may maintain a state of readiness to take over the master role if master routing engine 310-A fails. Backup routing engine 310-B may synchronize with master routing engine 310-A in terms of protocol states, forwarding tables, etc., so that backup routing engine 310-B is prepared to preserve routing information and maintain network connectivity without disruption in case master routing engine 310-A becomes unavailable. Thus, the roles (e.g., master or backup) of external routing engines 310-A and 310-B may be interchangeable. The chassis management processes and control protocols may be generated by compiling source code for an application or part of an operation system (OS), such as, for example, the Juniper Operating System (JUNOS), the Cisco Internet Operating System (IOS), and the like.

Line cards 320 may correspond to line interfaces 230 of FIG. 2. Some line cards 320 may also be configured to act as a master (e.g., line card 320-A) and some line cards 320 may also be configured to act as a backup (e.g., line card 320-B). In some implementations, multiple line cards 320 (e.g., 8, 16, etc.) may be included within a single chassis or virtual chassis. A master line card (or backup line card) may perform chassis control protocols for other line cards 320.

Line card processors 322 may correspond to system control module 210 of FIG. 2. The master line card processor (e.g., line card processor 322-A) or the backup line card processor (e.g., line card processor 322-B) may run chassis management processes and control protocols for core network device 110 and manage individual line cards 320. In one implementation, the master line card processor (e.g., line card processor 322-A) may receive and implement instructions from master routing engine 310-A. In other implementations (e.g., when line cards are part of a virtual chassis), master line card processor 322-A may perform functions of master routing engine 310-A. The roles (e.g., master or backup) of line card processor 322-A and 322-B may be interchangeable and/or exchanged with other line cards processors (e.g., line card processor 322-X).

PFE 324 may provide for input processing, route lookup, and output processing of packets. For example, PFE 324 may perform route lookups, classification of packets (e.g., for security purposes), policy-based routing, quality of service (QoS) routing, filtering of packets, and/or other forms of packet processing (e.g., packet statistical processing, accounting, and/or encapsulation). PFE 324 may perform these or other packet processing operations (e.g., packet parsing, packet rewriting, nexthop determinations, K-Tree determinations, and/or firewall determinations) based on microinstructions. The microinstructions may be generated by compiling source code for an application or part of an operation system (OS), such as, for example, the Juniper Operating System (JUNOS), the Cisco Internet Operating System (IOS), and the like. PFE 324 may execute the microinstructions in one or more processes or threads.

Although FIG. 3 illustrates exemplary functional components of core network device 110, in other implementations core network device 110 may include fewer, different, differently arranged, or additional functional components than those depicted in FIG. 3. Additionally, or alternatively, one or more functional components of core network device 110 may perform one or more the tasks described as being performed by one or more other functional components of core network device 110.

Exemplary Upgrade Communications

Figure 4B:
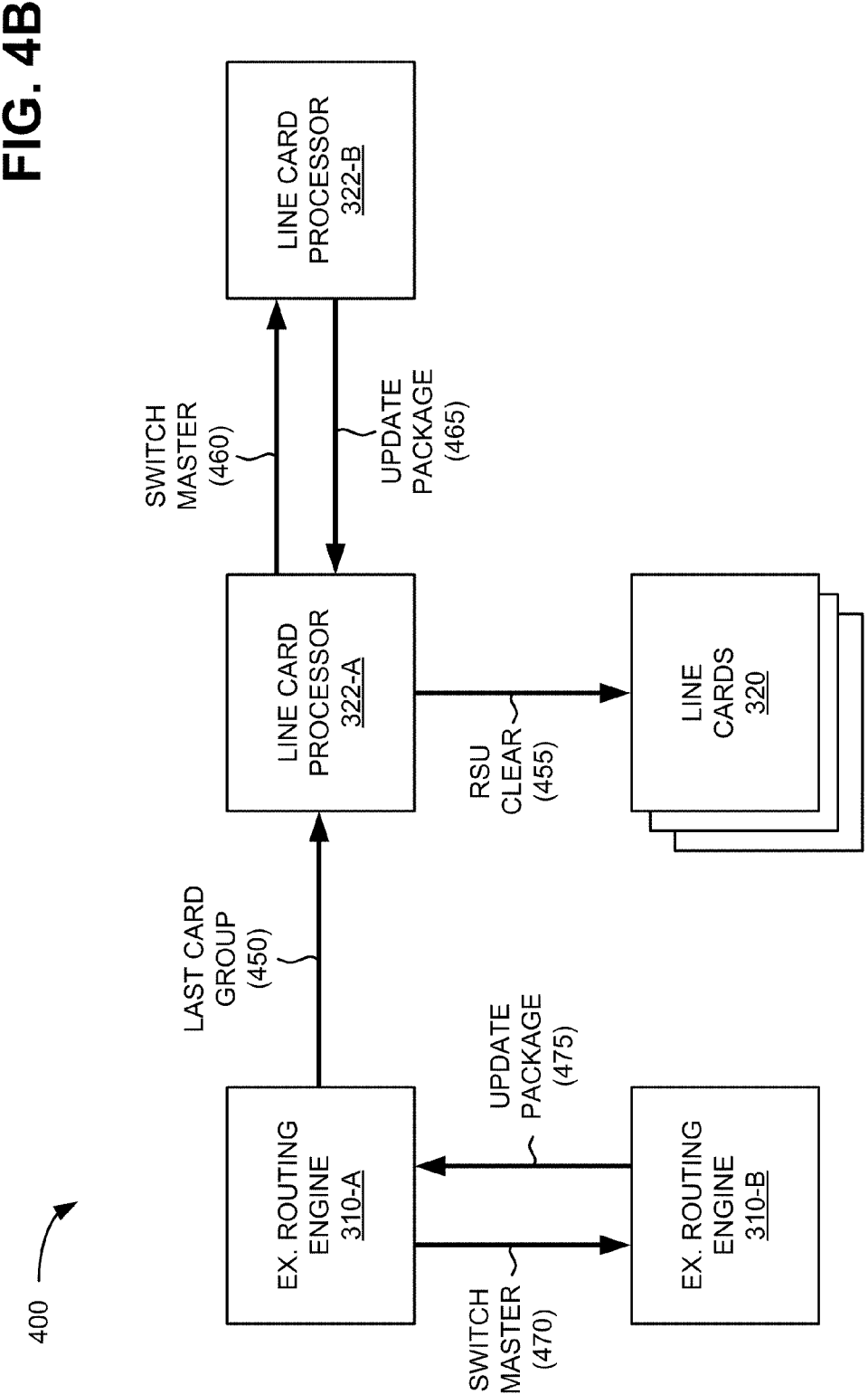

FIGS. 4A and 4B illustrate diagrams of exemplary interactions among components of an exemplary portion 400 of core network device 110. As shown, portion 400 may include external routing engines 310-A and 310-B, line card processors 322-A and 322-B, and line cards 320. External routing engines 310-A and 310-B may function interchangeably as a master routing engine and a backup routing engine. Similarly, line card processors 322-A and 322-B may function interchangeably as a master processor and a backup processor. Assume for the description of FIGS. 4A and 4B, that external routing engine 310-A and line card processor 322-A are masters, while external routing engine 310-B and line card processor 322-B are backups. While portion 400 is shown with a single set of masters and backups, in other implementations (e.g., in a virtual chassis that includes multiple modular chassis), there may be multiple sets of masters and backups (e.g., one for each modular chassis).

Assume portion 400 is running a version of software ("software X") that is to be upgraded to another version ("software Y"). A package for new software version (software Y) may be loaded into external routing engine 310-A. The package may include, for example, software images (e.g., OS files) for the external routing engines (e.g., external routing engines 310-A and 310-B) and line cards 320 (including line card processors 322-A and 322-B). In response to a user instruction, such as a command line interface (CLI) command, external routing engine 310-A may copy the upgrade software image to backup external routing engine 310-B, as indicated by reference number 405. External routing engine 310-B may install the upgrade software image and reboot to initialize the software upgrade (software Y) on external routing engine 310-B.

External routing engine 310-A may also forward the new software package to line card processor 322-A, as indicated by reference number 410. Line card processor 322-A may initiate a local image upgrade. As indicated by reference number 415, line card processor 322-A may copy the upgrade software image to backup line card processor 322-B, which may install the image and reboot to initialize the software upgrade (software Y) on line card processor 322-B.

Line card processor 322-A may also send rolling software upgrade (RSU) prepare messages 420 to each of line cards 320 for which line card processor 322-A is master. RSU prepare messages 420 may signal each line card 320 to prepare for a rolling software upgrade. Particularly, in one implementation, each line card 320 may set a flag (e.g., an "rsu-in-progress" flag) in a boot string so that the line card 320 will obtain the upgraded image (e.g., for software Y) from backup line card processor 322-B upon a reboot. Once each line card 320 has prepared for the rolling software upgrade (e.g., by setting the "rsu-in-progress" flag), each line card 320 may respond to line card processor 322-A with a RSU ready message 425.

Line card processor 322-A may forward the RSU ready messages 425 to external routing engine 310-A. Alternatively, line card processor 322-A may compile all the RSU ready messages 425 and send a single ready-to-reboot message to external routing engine 310-A when ready messages 425 have been received from all of line cards 320 for which line card processor 322-A is master.

External routing engine 310-A may determine particular groups of line cards that may be upgraded in parallel. For example, external routing engine 310-A may use available LAG membership information to derive a list of sets of line cards, so that as many line cards as possible may be rebooted in parallel while still keeping all of the LAGs active (e.g., at least one link in each LAG will remain up during the rolling software upgrade). The reboot process for each line card may include resetting the operating system associated with core network device 110. Thus, the new (upgraded) operating system may be substituted for previous operating system during the reboot process.

For purposes of illustration, assume a single core network device 110 in a modular chassis configuration includes eight (8) line cards 320, labeled 0 through 7. Further assume four sets of LAGs are defined as follows:
 LAG #1: (0, 1, 2, 6),
 LAG #2: (0, 3, 5),
 LAG #3: (1, 2, 4), and
 LAG #4: (0, 3, 4, 7).
In this situation, external routing engine 310-A may derive two groups of line cards for rebooting:
 Group #1: (0, 1, 3, 6) and
 Group #2: (2, 4, 5, 7).
In a virtual chassis configuration (e.g., virtual chassis 170 of FIG. 1B), multiple local network devices 120 may be interconnected to form a single logical core network device 110. Thus, the functionality of the eight (8) line cards in a modular configuration may be spread among multiple network devices. In a virtual chassis configuration, the single number representing each line card (e.g., 0 through 7 above) may be replaced with a pair (t, u), where t represents particular chassis and u represents the particular line card within that chassis.

Based on the derivations of the line card groups and in response to ready messages 425, external routing engine 310-A may send a list of the first upgrade group (e.g., Group #1 in the example above) to master line card processor 322-A, as indicated by reference number 430. Master line card processor 322-A may receive the list of the first upgrade group and initiate a reboot signal 435 for the line cards 320 in that upgrade group (e.g., line cards 0, 1, 3 of Group #1).

In response to reboot signal 435, each line card 320 in the upgrade group may perform a reboot in parallel. In one implementation, based on the "rsu-in-progress" flag, each line card 320 may obtain the upgrade image from backup line card processor 322-B. In another implementation, master line card processor 322-A may retrieve the necessary upgrade image from backup line card processor 322-B and provide the upgrade image to each line card 320. Each reboot may initialize the software upgrade (e.g., software Y) on each line card 320.

After the line cards 320 are upgraded, each line card 320 may connect to backup line card processor 322-B and backup external routing engine 310-B (each running the new software (software Y)) to obtain local state updates 440 from backup line card processor 322-B and/or global state updates from backup external routing engine 310-B. When each reboot is successfully completed, each line card 320 may send a ready message 445 to master line card processor 322-A. Master line card processor 322-A may forward ready messages 445 individually to master external routing engine 310-A. Alternatively, master line card processor 322-A may compile ready messages 445 from all the line cards 320 in the upgrade group and send a single ready message to master external routing engine 310-A when ready messages 445 have been received from all of line cards 320 in the upgrade group.

Master external routing engine 310-A may then send the next upgrade group (e.g. Group #2) and communications in reference 430, 435, 440, and 445 may be repeated until all line cards have been upgraded.

Referring to FIG. 4B, when master external routing engine 310-A determines that all line cards 320 have been upgraded, master external routing engine 310-A may inform master line card processor 322-A that the last group of line cards has been upgraded, as indicated by reference number 450. In response, master line card processor 322-A may send an RSU clear message 455 to informs all line cards 320 to clear the upgrade flag (e.g., "rsu-in-progress" flag) from the respective boot strings.

Line card processor 322-A may switch 460 over to the backup role so that line card processor 322-B becomes the new master, and new backup line card processor 322-A may re-sync states from new master line card processor 322-B. Line cards 320 may now all connect to new master line card processor 322-B. External routing engine 310-A may switch 470 over to the backup role so that external routing engine 310-B becomes the new master. New master line card processor 322-B may establish a connection to new master external routing engine 310-B. The old masters (e.g., external routing engine 310-A and line card processor 322-A) may then be upgraded with the new software image in parallel, as indicated by reference numbers 465 and 475, respectively.

Although FIG. 4 shows exemplary components of portion 400 of core network device 110, in other implementations, core network device 110 may contain fewer components, different components, differently arranged components, or additional components than depicted in FIG. 4. Alternatively, or additionally, one or more components of core network device 110 may perform one or more tasks described as being performed by one or more other components of core network device 110.

Exemplary Process

FIGS. 5-7 are flow charts of an exemplary process 500 for process for performing rolling software upgrades according to an implementation described herein. In one implementation, process 500 may be performed by core network device 110. In another implementation, some or all of process 500 may be performed by another device (e.g., management console 140) in conjunction with core network device 110.

Process 500 may include sending an upgrade package to a backup external routing engine and a backup line card processor and initiating a reboot of the backups (block 510). For example, as described above in connection with FIG. 4A, a package for a new software version may be loaded into external routing engine 310-A. The package may include, for example, software images (e.g., OS files) for the external routing engines (e.g., external routing engines 310-A and 310-B) and line cards 320 (including line card processors 322-A and 322-B). In response to a user instruction, such as a CLI command, external routing engine 310-A may copy the upgrade software image to backup external routing engine 310-B, as indicated by reference number 405. External routing engine 310-B may install the upgrade software image and reboot to initialize the software upgrade on external routing engine 310-B. External routing engine 310-A may also forward the new software package to line card processor 322-A, as indicated by reference number 410. Line card processor 322-A may initiate a local image upgrade. As indicated by reference number 415, line card processor 322-A may copy the upgrade image to backup line card processor 322-B, which may install the image and reboot to initialize the software upgrade (software Y) on line card processor 322-B. The master line card processor may also prepare the line cards for conducting rolling software upgrades.

Referring again to FIG. 5, process 500 may include preparing local line cards of a rolling software upgrade (block 520) and determining a first/next line card group for the rolling software upgrade (block 530). Process blocks 520 and 530 are described further in connection with FIGS. 6 and 7, respectively.

Returning to FIG. 5, process 500 may further include initiating a parallel reboot of a first/next line card group (block 540) and obtaining the upgraded software image for each line card of the line card group (block 550). For example, as described above in connection with FIG. 4A, master line card processor 322-A may receive the list of the first upgrade group and initiate a reboot signal 435 for the line cards 320 in that upgrade group (e.g., line cards 0, 1, 3 of Group #1). In response to reboot signal 435, each line card 320 in the upgrade group may perform a reboot in parallel. In one implementation, based on the "rsu-in-progress" flag, each line card 320 may obtain the upgrade image from backup line card processor 322-B. In another implementation, master line card processor 322-A may retrieve the necessary upgrade image from backup line card processor 322-B and provide the upgrade image to each line card 320. Each reboot may initialize the software upgrade on each line card 320.

Returning again to FIG. 5, process 500 may further include determining if another line card group remains to be upgraded (block 560). For example, as described above in connection with FIG. 4A, when each reboot is successfully completed, each line card 320 may send a ready message 445 to master line card processor 322-A. Master line card processor 322-A may forward the ready messages 445 individually to master external routing engine 310-A. Alternatively, master line card processor 322-A may compile ready messages 445 from all line cards 320 in the upgrade group and send a single ready message to master external routing engine 310-A when ready messages 445 have been received from all of line cards 320 in the upgrade group.

If another line card group remains to be upgraded (block 560—YES), process 500 may return to block 530. If no other line card group remains to be upgraded (block 560—NO), process 500 may proceed to switch the master line card processor with the backup line card processor (block 570) and reboot the former master line card processor (block 580). For example, as described above in connection with FIG. 4B, when master external routing engine 310-A determines that all line cards 320 have been upgraded, line card processor 322-A may switch 460 over to the backup role so that line card processor 322-B becomes the new master, and new backup line card processor 322-A may re-sync states from new master line card processor 322-B. Line cards 320 may now all connect to new master line card processor 322-B. External routing engine 310-A may switch 470 over to the backup role so that external routing engine 310-B becomes the new master. New master line card processor 322-B may establish a connection to new master external routing engine 310-B. The old masters (e.g., external routing engine 310-A and line card processor 322-A) may then be upgraded with the new software image in parallel, as indicated by reference numbers 465 and 475, respectively.

Process block 520 may include the process blocks depicted in FIG. 6. As shown in FIG. 6, process block 520 may include sending a RSU prepare message to all line cards (block 600), setting, at each line card, a RSU in progress flag (block 610), receiving from each line card an RSU ready message (block 620), and sending a consolidated ready message to the external routing engine (block 630). For example, as described above in connection with FIG. 4A, line card processor 322-A may send RSU prepare messages 420 to each of line cards 320 for which line card processor 322-A is master. RSU prepare messages 420 may signal each line card 320 to prepare for a rolling software upgrade. Particularly, in one implementation, each line card 320 may set a flag (e.g., an "rsu-in-progress" flag) in a boot string so that the line card 320 will obtain the upgraded image (e.g., for software Y) from backup line card processor 322-B upon a reboot. Once each line card 320 has prepared for the rolling software upgrade (e.g., by setting the "rsu-in-progress" flag), each line card 320 may respond to line card processor 322-A with a RSU ready message 425. Line card processor 322-A may forward RSU ready messages 425 to external routing engine 310-A. Alternatively, line card processor 322-A may compile all RSU ready messages 425 and send a single ready-to-reboot message to external routing engine 310-A when ready messages 425 have been received from all of line cards 320 for which line card processor 322-A is master.

Process block 530 may include the process blocks depicted in FIG. 7. As shown in FIG. 7, process block 530 may include identifying LAG membership information for all line cards (block 700), deriving line card groups from the LAG membership information such that each group keeps all LAGs active during reboot (block 710), and sending a first/next line card group to the master line card processor (block 720). For example, as described above in connection with FIG. 4A, external routing engine 310-A may determine particular groups of line cards that may be upgraded in parallel. For example, external routing engine 310-A may use available LAG membership information to derive a list of sets of line cards, so that as many line cards as possible may be rebooted in parallel while still keeping all of the LAGs active (e.g., at least one link in each LAG will remain up during the rolling software upgrade). Based on the derivations of the line card groups and in response to ready messages 425, external routing engine 310-A may send a list of the first upgrade group to master line card processor 322-A, as indicated by reference number 430.

CONCLUSION

Implementations described herein may provide systems and/or methods that enable rolling software upgrades of line cards and other components in a chassis-based network device. When every link to the modular chassis or virtual chassis is employed as an aggregated link (LAG), the systems and/or methods described herein may provide a relatively simple solution to the complex problem of performing software upgrades without disrupting services. For example, implementations described herein eliminate the need to keep track of the software modules state, since the line cards (and thus the corresponding PFEs) are completely rebooted to keep the software state and hardware state in sync.

The foregoing description of implementations provides an illustration, but is not intended to be exhaustive or to limit the implementations to the precise form disclosed. Modifications and variations are possible in light of the above teachings or may be acquired from practice of the teachings.

In addition, while series of blocks have been described with regard to the process illustrated in FIG. 5-7, the order of the blocks may be modified in other implementations. Further, non-dependent blocks may be performed in parallel.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a network device, the method comprising:
  receiving, by the network device, an upgrade package,
    the network device operating as one of a modular chassis or a virtual chassis that corresponds to a single logical network device;
  sending, by a master routing component of the network device, the upgrade package to a backup routing component of the network device;
  preparing, by the network device, multiple line cards for a software upgrade,
    ports, in each line card of the multiple line cards, being part of a link aggregation group (LAG);
  determining, by the network device, a subset of the multiple line cards on which to perform the software upgrade;
  initiating, by the network device, a reboot process for the subset of the multiple line cards,
    the reboot process resulting in a software upgrade for each line card, of the subset of the multiple line cards;
  repeating the determining and the initiating until each line card, in the multiple line cards, is upgraded; and
  switching, by the network device and based on each line card of the multiple line cards being upgraded, the role of the backup routing component and the role of the master routing component to designate another master routing component and another backup routing component.

2. The method of claim 1, where preparing the multiple line cards for the software upgrade includes:
  sending a prepare message to each line card of the multiple line cards;
  setting, at each line card of the multiple line cards, an upgrade-in-progress flag; and receiving, from each line card of the multiple line cards, a ready-to-upgrade message.

3. The method of claim 1, where determining the subset of the multiple line cards on which to perform the software upgrade includes:
identifying LAG membership information for each line card of the multiple line cards; and
deriving multiple subsets of the multiple line cards such that each LAG, associated with a corresponding one of the multiple line cards, remains active during the reboot process of each of the multiple subsets of the multiple line card.

4. The method of claim 1, further comprising:
sending, by the other master routing component, the upgrade package to the other backup routing component; and
initiating a reboot of the other backup routing component.

5. The method of claim 1, where initiating the reboot process includes:
initiating the reboot process for each line card, of the subset of the multiple line cards, in parallel.

6. The method of claim 1, further comprising:
obtaining, by each line card of the subset of the multiple line cards, the software upgrade from one of the master routing component or the backup routing component.

7. The method of claim 1, where the repeating includes:
determining, by the network device, a next subset of the multiple line cards on which to perform the software upgrade; and
initiating, by the network device, a reboot process for the next subset of the multiple line cards,
where the reboot process for each line card, of the next subset of the multiple line cards,. results in a software upgrade.

8. The method of claim 1, further comprising:
performing software upgrades of multiple line cards from multiple chassis in parallel.

9. A network device, comprising:
one or more memory devices to store a software upgrade package and a plurality of instructions; and
one or more processors to execute the plurality of instructions to:
install the software upgrade package on a backup routing component;
determine subsets of multiple line cards on which to perform a software upgrade,
ports, in each line card of the multiple line cards, being part of a link aggregation group (LAG);
initiate a reboot process for each of the subsets of the multiple line cards, in sequence,
the reboot process for each line card, of the subsets of the multiple line cards, resulting in a software upgrade without deactivating any LAG associated with the multiple line cards;
switch the backup routing component and a master routing component to designate another master routing component and another backup routing component; and
install the upgrade package on the other backup routing component.

10. The network device of claim 9, where the network device includes one of a modular chassis or a virtual chassis that corresponds to a single logical network device.

11. The network device of claim 9, where the one or more processors are further to:

send a first message, to each line card of the multiple line cards, indicating that the line card is to prepare for the software upgrade;
set, at each line card of the multiple line cards, a flag associated with the software upgrade; and
receive, from each line card of the multiple line cards, a second message after the flag has been set.

12. The network device of claim 11, where the one or more processors are further to:
clear, at each line card of the multiple line cards, the flag when each line card of the multiple line cards has received the software upgrade.

13. The network device of claim 9, where, when initiating the reboot process, the one or more processors are to: reset an operating system associated with the network device.

14. The network device of claim 9, where, when determining the subsets of the multiple line cards on which to perform the software upgrade, the one or more processors are further to:
identify LAG membership information for each line card of the multiple line cards; and
derive multiple subsets of the multiple line cards such that each LAG, associated with a corresponding one of the multiple line cards, remains active during a reboot process of any of the multiple subsets of the multiple line cards.

15. The network device of claim 9, where the one or more processors are to:
perform the reboot process for each line card, of the subset of the multiple line cards, in parallel.

16. A non-transitory computer-readable medium storing instructions, the instructions comprising:
one or more instructions which, when executed by one or more processors, cause the one or more processors to alter the reboot instructions for multiple line cards to enable a software upgrade of the multiple line cards,
ports, in each line card of the multiple line cards, are part of a link aggregation group (LAG);
one or more instructions which, when executed by the one or more processors, cause the one or more processors to determine a subset of the multiple line cards on which to perform the software upgrade without deactivating the LAG;
one or more instructions which, when executed by the one or more processors, cause the one or more processors to initiate a reboot process for the subset of the multiple line cards,
the reboot process for each line card, of the subset of the multiple line cards, results in the software upgrade without deactivating the LAG; and
one or more instructions which, when executed by the one or more processors, cause the one or more processors to restore the reboot instructions for the multiple line cards to terminate the software upgrade.

17. The network device of claim 16, where the one or more instructions to determine the subset of the multiple line cards on which to perform the software upgrade without deactivating the LAG further comprise:
one or more instructions to determine a maximum number of line cards that can be rebooted in parallel.

18. The network device of claim 16, where the instructions further comprise:
one or more instructions to send a first message, to each line card of the multiple line cards, indicating that the line card is to prepare for the software upgrade;

one or more instructions to set, at each line card of the multiple line cards, a flag associated with the software upgrade; and one or more instructions to receive, from each line card of the multiple line cards, a second message after the flag has been set.

19. The network device of claim 16, where the one or more instructions to determine the subset of the multiple line cards on which to perform the software upgrade comprise:

one or more instructions to identify LAG membership information for each line card of the multiple line cards; and one or more instructions to derive multiple subsets of the multiple line cards to enable each LAG, associated with a corresponding one of the multiple line cards, to remain active during a reboot process of each of the multiple subsets of the multiple line cards.

20. The network device of claim 16, where the instructions further comprise:

one or more instructions to initiate the reboot process for each line card, of the subset of the multiple line cards, in parallel.

* * * * *